US008729459B2

(12) United States Patent  
Benou et al.

(10) Patent No.: US 8,729,459 B2
(45) Date of Patent: May 20, 2014

(54) APPARATUS AND METHOD FOR DETECTING OPTICAL ENERGY IN AN OPTICAL FIBER

(75) Inventors: Marc Benou, Westfield, NJ (US); Thomas Fogg, Pittstown, NJ (US); Shirley J. Fogg, legal representative, Pittstown, NJ (US)

(73) Assignee: Conolog Corporation, Somerville, NJ (US)

( * ) Notice: Subject to any disclaimer, the term of this patent is extended or adjusted under 35 U.S.C. 154(b) by 392 days.

(21) Appl. No.: 13/070,589

(22) Filed: Mar. 24, 2011

(65) Prior Publication Data

US 2011/0309273 A1    Dec. 22, 2011

Related U.S. Application Data

(60) Provisional application No. 61/317,366, filed on Mar. 25, 2010.

(51) Int. Cl.
*H01J 5/02*       (2006.01)
*G01J 1/04*       (2006.01)
*G02F 1/295*      (2006.01)
*G02B 6/00*       (2006.01)

(52) U.S. Cl.
USPC ............ 250/239; 250/227.14; 385/5; 385/13

(58) Field of Classification Search
USPC .............................. 250/208.1, 216, 221, 239, 250/227.14–227.29; 385/1, 4, 5, 9, 12, 13
See application file for complete search history.

(56) References Cited

U.S. PATENT DOCUMENTS

| 4,671,653 | A | * | 6/1987 | So et al. ........................ 356/73.1 |
| 4,672,198 | A | | 6/1987 | Presby |
| 4,775,233 | A | | 10/1988 | Kaneshi et al. |
| 5,067,786 | A | | 11/1991 | Hawkins et al. |
| 5,138,690 | A | | 8/1992 | Cox |
| 5,315,675 | A | | 5/1994 | Dennis et al. |
| 5,321,257 | A | | 6/1994 | Danisch |
| 5,381,492 | A | * | 1/1995 | Dooley et al. .................. 385/12 |
| 5,519,795 | A | | 5/1996 | Bender et al. |
| 5,591,964 | A | | 1/1997 | Poole |
| 5,708,499 | A | | 1/1998 | Baden et al. |
| 5,742,715 | A | | 4/1998 | Boehlke et al. |
| 5,781,285 | A | | 7/1998 | Mampaey et al. |
| 7,283,688 | B2 | | 10/2007 | Frigo et al. |
| 7,558,451 | B2 | | 7/2009 | Lu |
| 8,179,935 | B2 | * | 5/2012 | Santori et al. .................. 372/34 |
| 2004/0108446 | A1 | | 6/2004 | Hildebrandt |

OTHER PUBLICATIONS www.fiberdyne.com/products/ofi.html (2009).

* cited by examiner

*Primary Examiner* — Kevin Pyo
*Assistant Examiner* — Don Williams
(74) *Attorney, Agent, or Firm* — Lerner, David, Littenberg, Krumholz & Mentlik, LLP

(57) ABSTRACT

An apparatus for optical signal detection may include a housing in which a channel may be defined to receive an optical fiber in a bent configuration. The channel may have a predetermined radius of curvature to cause optical energy to escape from the fiber when an optical signal is being conveyed in the fiber and be detected at a photodetector arranged at the predetermined radius of curvature.

20 Claims, 14 Drawing Sheets

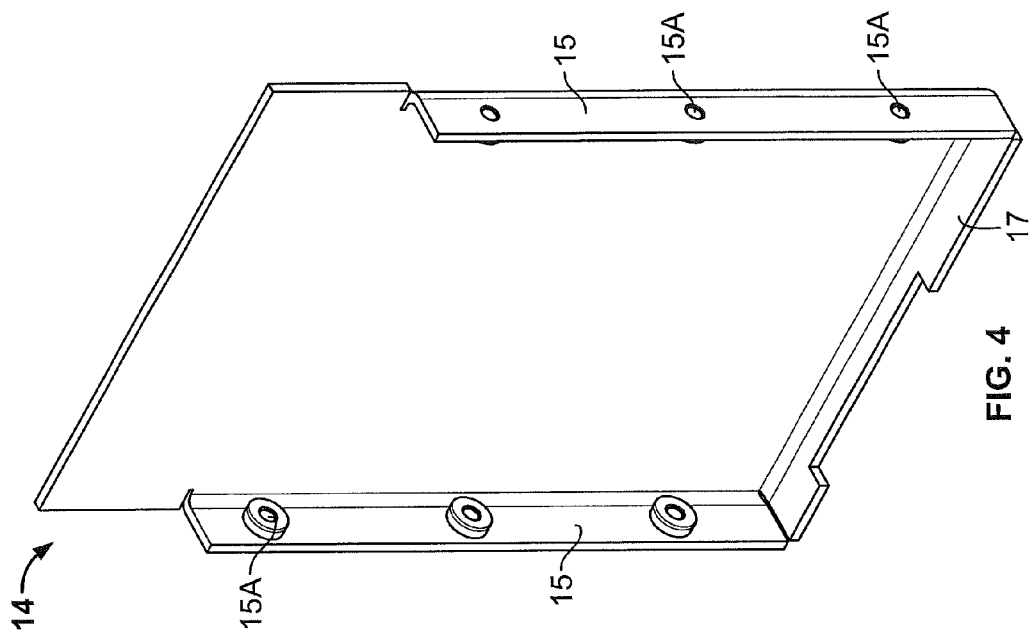
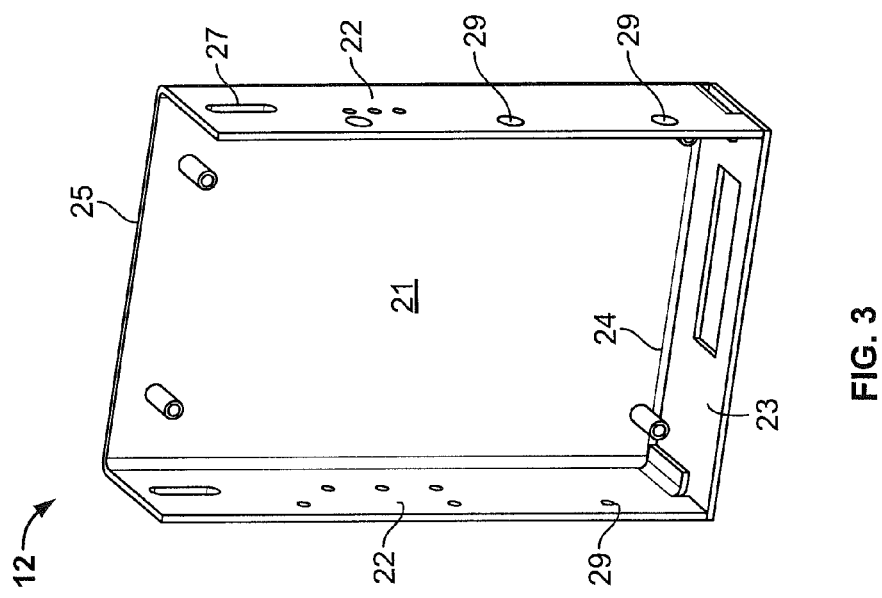
FIG. 4
FIG. 3

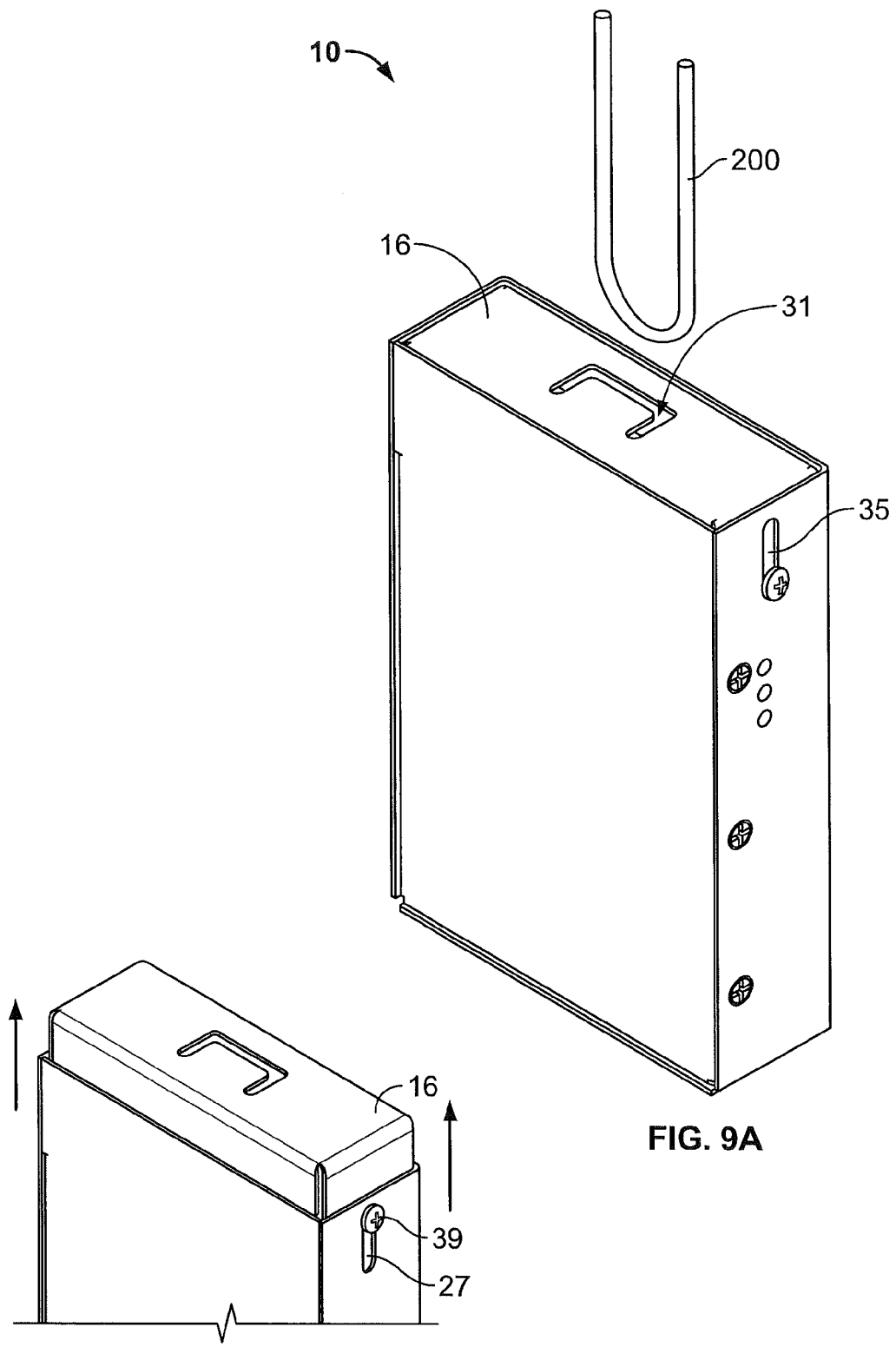

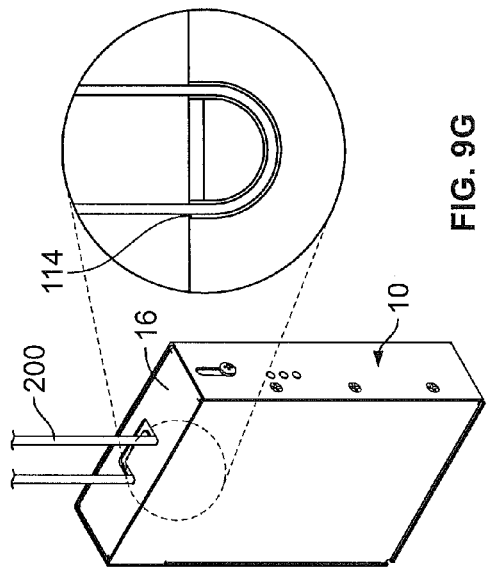
FIG. 9G
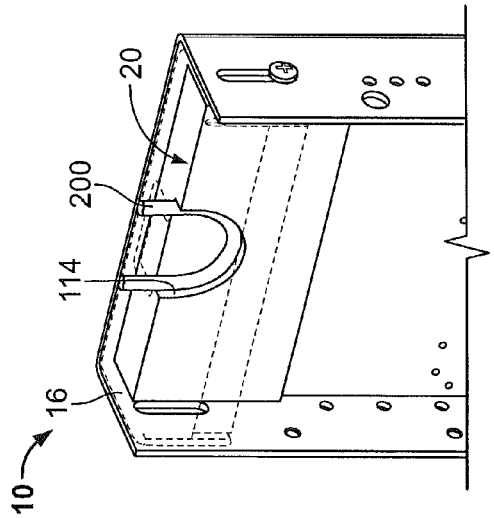
FIG. 9H
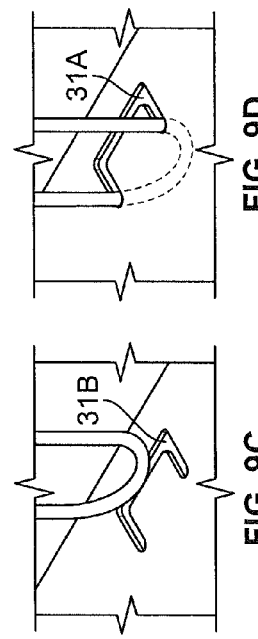
FIG. 9D
FIG. 9C
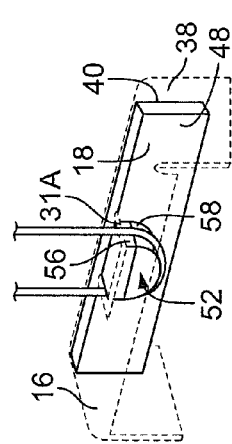
FIG. 9E
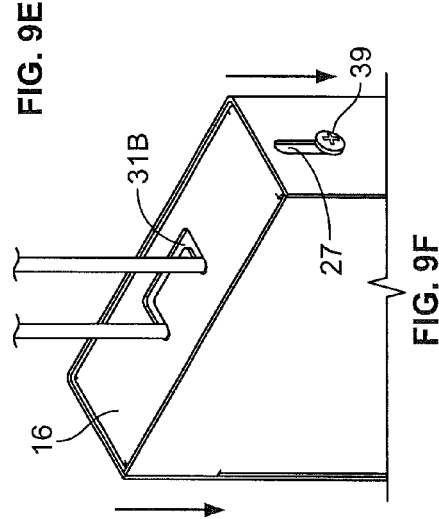
FIG. 9F

APPARATUS AND METHOD FOR DETECTING OPTICAL ENERGY IN AN OPTICAL FIBER

CROSS-REFERENCE TO RELATED APPLICATION

This application claims benefit of the filing date of U.S. Provisional Patent Application No. 61/317,366, filed Mar. 25, 2010, the disclosure of which is hereby incorporated herein by reference.

FIELD OF THE INVENTION

The present invention relates to detection of optical energy in an optical fiber, and more particularly, non-invasively determining whether an optical signal is being conveyed in an optical fiber by detecting optical energy that escapes from a bent portion of the optical fiber.

BACKGROUND OF THE INVENTION

In the prior art, devices that may detect non-invasively whether an optical signal is being conveyed in an optical fiber often require bending of the optical fiber. In many of these devices, the positioning of the optical fiber within the device in a bent configuration often causes damage to the optical fiber.

Also, prior art optical energy detection devices sometimes provide an incorrect indication that an optical signal is being conveyed within an optical fiber, because the device does not sufficiently insulate components which detect optical energy escaping the optical fiber, such as photodiodes, from exposure to optical energy other than the optical energy escaping the optical fiber. Further, such incorrect indications may occur in prior art detectors, because of the design of the electrical circuitry used with photodiodes to determine whether an optical signal is being conveyed in the optical fiber.

Accordingly, there is a need for apparatus and method that accurately and non-invasively determine whether an optical signal is being conveyed in an optical fiber, while avoiding damage to the optical fiber.

SUMMARY OF THE INVENTION

An apparatus for optical signal detection may include a housing having a first member and a second member. The first member may have a first surface from which a bending unit projects, where the bending unit has an arcuate surface. The second member may have a second surface and define a cavity having a first cavity portion and a second cavity portion. The first cavity portion may have a first arcuate surface and the second cavity portion may have a second arcuate surface. The cavity may be configured such that the first and second members are arrangeable to obtain an operational state of the apparatus in which the first and second surfaces contact each other, the bending unit occupies substantially all of the first cavity portion and a portion of the arcuate surface of the bending unit opposes the second arcuate surface to define a channel having a predetermined radius of curvature coextensive with the second arcuate surface. The apparatus may include at least one photodetector at the second arcuate surface so as to be tangent to an optical fiber when the optical fiber is installed extending through the channel. The radius of curvature may be adapted to cause optical energy to escape from a portion of the optical fiber installed in the channel adjacent to the photodetector and be detected at the photodetector when an optical signal is being conveyed in the optical fiber.

In accordance with another aspect of the invention, an apparatus for optical signal detection may include a housing having a first member and second member arrangeable in contact with each other to define a channel having a predetermined radius of curvature coextensive with an arcuate surface of the second member. The apparatus may also include at least one photodetector at the arcuate surface and to be tangent to an optical fiber when the optical fiber is installed in the channel. The radius of curvature may cause optical energy to escape from a portion of the optical fiber installed in the channel adjacent to the photodetector and be detected at the photodetector when an optical signal is being conveyed in the optical fiber. The apparatus may further include an indicator to indicate detection of optical energy at the photodetector when the optical fiber is installed in the channel and an optical signal is being conveyed in the optical fiber.

BRIEF DESCRIPTION OF THE DRAWINGS

These and other features, aspects, and advantages of the present invention will become better understood with regard to the following description, appended claims and accompanying drawings where:

FIG. 3 is a perspective view of a base member of the apparatus of FIG. 1;

FIG. 4 is a perspective view of a base cover of the apparatus of FIG. 1;

FIG. 9A is a perspective of the apparatus of FIG. 1 in an assembled state prior to installation of an optical fiber.

FIGS. 9B-9H are perspectives views of portions of the apparatus of FIG. 1 during stages of an exemplary process to install an optical fiber within the apparatus of FIG. 1 and arrange the apparatus in an operational state, in accordance with an aspect of the invention.

DETAILED DESCRIPTION OF THE INVENTION

Figure 1:
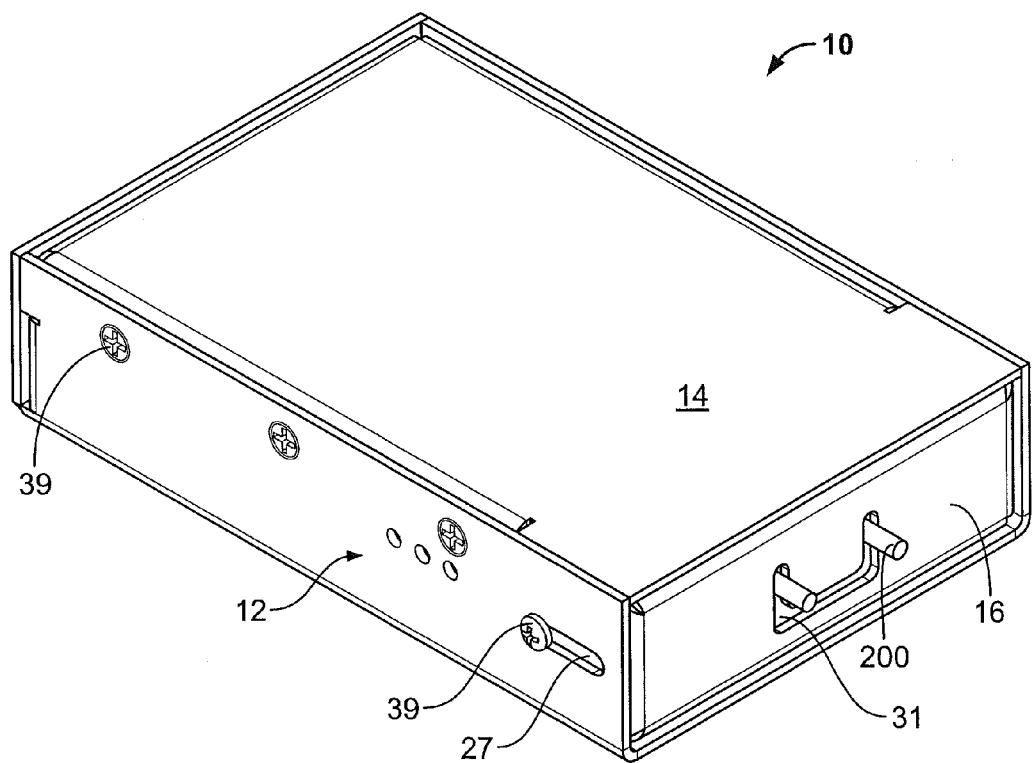
FIG. 1 is a perspective view of an exemplary apparatus for detecting an optical signal in an optical fiber, in accordance with an aspect of the invention.

An apparatus 10 to detect, non-invasively, whether an optical signal is being conveyed in an optical fiber, in accordance with aspects of the present invention, is shown in FIG. 1. Referring to FIG. 1 and also to FIGS. 2-8, the apparatus 10 may include a base member 12, a base cover 14, a front cover 16, a bending member 18, a detection member 20 and an electro-optical assembly 22.

Referring to FIG. 3, the base member 12 may include a base panel 21 having opposing parallel edges 24, 25 at its ends, opposing parallel side panels 22 extending perpendicularly away from the base panel 21, and an end panel 23 near the edge 24 of the base member 12. The end panel 23 extends from the side panels 22, and from near the edge 24 of and perpendicularly away from the base panel 21. The side panels 22 near the edge 25 of the base panel 21 include slots 27 extending in a lengthwise direction, perpendicular to the direction in which the edges 24, 25 extend. In addition, the side panels 22 may include threaded apertures 29.

Referring to FIG. 4, the base cover 14 may include opposing parallel sides 15 with threaded apertures 15A and an end panel 17. The apertures 15A are positioned so that they are aligned with the apertures 29 of the base member 12, when the base cover 14 is placed over the base member 12 to obtain an assembled state of the apparatus 10. In the assembled state of the apparatus, screws 39 threaded through the apertures 29 and the apertures 15A attach the base cover 14 to the base member 12.

Figure 2:
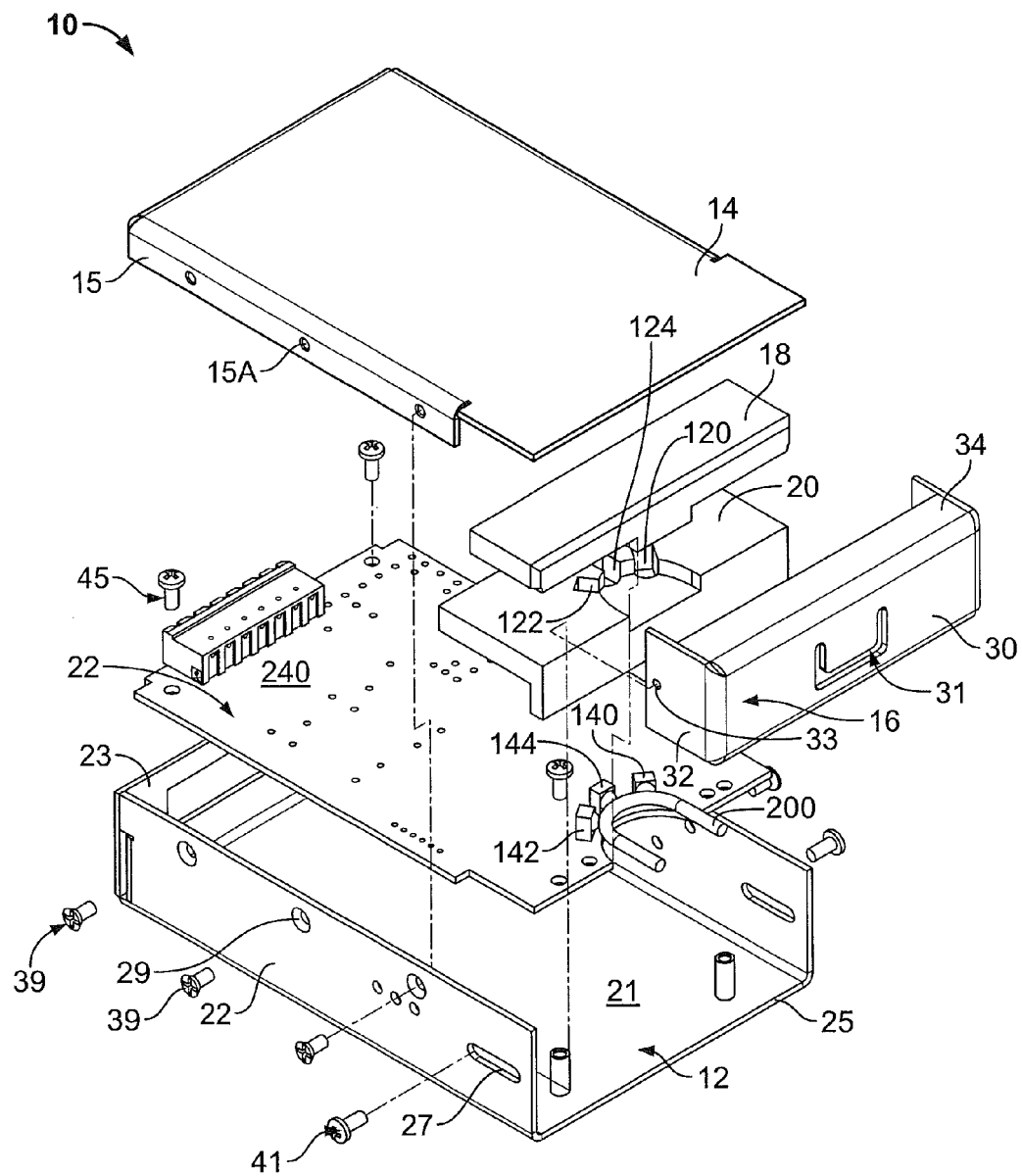
FIG. 2 is an exploded perspective view of the apparatus of FIG. 1.
Figure 5:
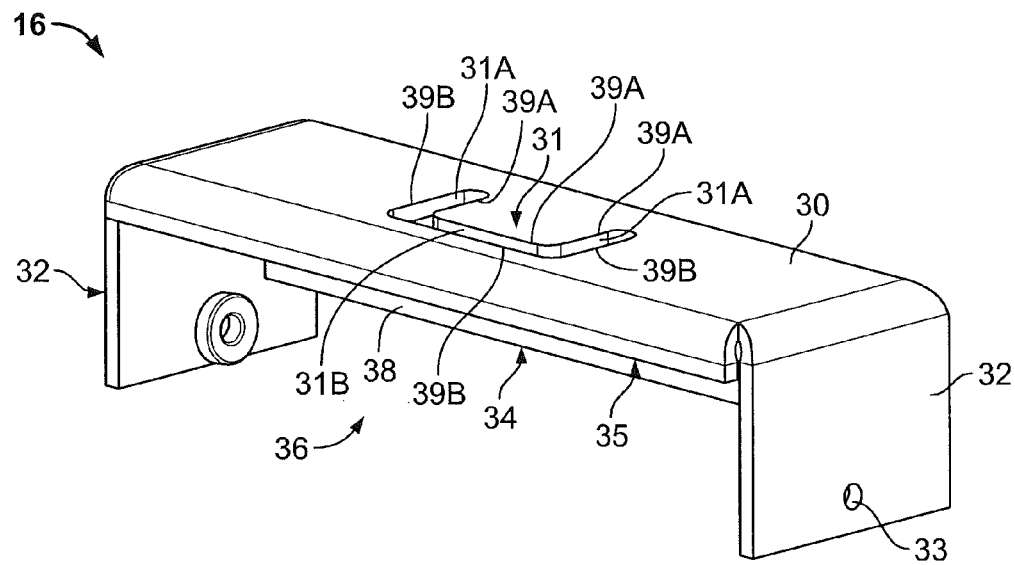
FIG. 5 is a perspective view of a front cover of the apparatus of FIG. 1.

Referring to FIGS. 1-2 and 5, the front cover 16 may include a front wall 30 extending from opposing, parallel side walls 32, and an end wall 34. The end wall 34 extends from the opposing side walls 32 and the front wall 30. The end wall 34 desirably extends perpendicularly away from the front wall 30 and the side walls 32. The walls 30, 32, 34 define a cavity region 36 that substantially contains the bending member 18 and the detection member 20 when the apparatus 10 is in the assembled state. The front wall 30 further defines a generally U-shaped aperture 31. The aperture 31 includes opposing legs 31A extending parallel to the side walls 33 and a base segment 31B extending perpendicular to and from ends of the opposing legs 31A. The legs 31A and the base segment 31B are defined by opposing surfaces 39A, 39B of the bending member 18. The side walls 32 further may define threaded apertures 33.

The base member 12, the base cover 14 and the front cover 16 desirably may be formed from plastic or metal.

The front cover 16 and the base member 12 are adapted such that, in the assembled state of the apparatus 10, the slots 27 and the apertures 33 are aligned and screws 41 may extend through the slots 27 and be threaded through the apertures 33, to attach the front cover to the base member. When the apparatus 10 is in the assembled state and the screws 39 are partially threaded through the apertures 33 of the front cover 16, the screws 39 may slide along the longitudinal length of the slot 27, such that the front cover 16 may be moved, as discussed in detail below, between an operational state, in which a portion of an optical fiber 200 may be maintained in a desired bent configuration within the apparatus as shown in FIGS. 1 and 9H, and a non-operational state, in which a portion of the optical fiber may be inserted into, moved within and removed from the apparatus as shown in FIGS. 9A-9G.

Figure 6:
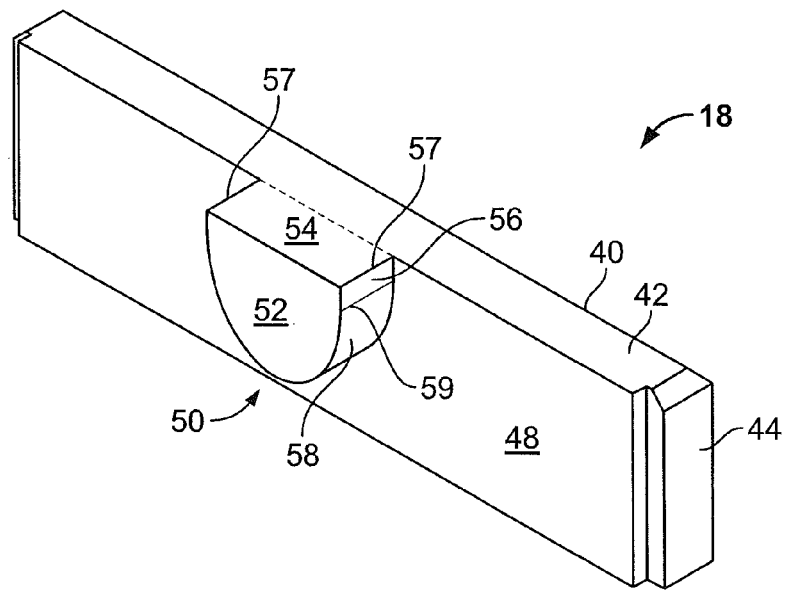
FIG. 6 is a perspective view of a bending member of the apparatus of FIG. 1.

Referring to FIG. 6, the bending member 18 may include a bottom surface 40, a front surface 42 and an inner surface 48 extending from opposing parallel side surfaces 44. The surfaces 40 and 48 desirably extend in parallel planes which are perpendicular to the plane in which the surface 42 extends, and the side surfaces 44 extend in parallel planes which are perpendicular to the planes in which the surfaces 40, 42 and 48 extend. A bending unit 50 may project away from the inner surface 48, desirably near a point midway between the opposing side surfaces 44. The bending unit 50 includes an inner surface 52 extending in a plane parallel to the surface 48, a front surface 54 and opposing side surfaces 56. The front surface 54 is coplanar with and extends from the front surface 42, and extends from opposing edges 57 in a direction perpendicular to the side surfaces 56. The opposing side surfaces 56 extend in planes parallel to each other and the surfaces 44, and extend from the surface 54 at the opposing edges 57. In addition, the bending unit 50 includes an arcuate surface 58 extending from opposing edges 59 of the respective opposing side surface 56s. The edges 57 and 59 are spaced from and extend parallel to each other.

The bending member 18 desirably may be formed from soft, resiliently deformable or pliable materials that absorb optical energy, such as foam and polyethylene.

The front cover 16 and the bending member 18 of the apparatus 10 are adapted such that the surface 40 of the bending member 18 may be fixed, such as by adhesive, to inner surface 38 of the wall 34 of the front cover 16, and the surfaces 54 and 42 of the bending member 18 may be fixed, such as by adhesive, to an inner surface 35 of the front wall 30 of the front cover 16. With the bending member 18 attached to the front cover 16 as described above, the opposing surfaces 56 of the bending member 18 are substantially aligned with the surfaces 39A defining the leg portions 31A of the aperture 31 of the front cover 16.

Figure 7A:
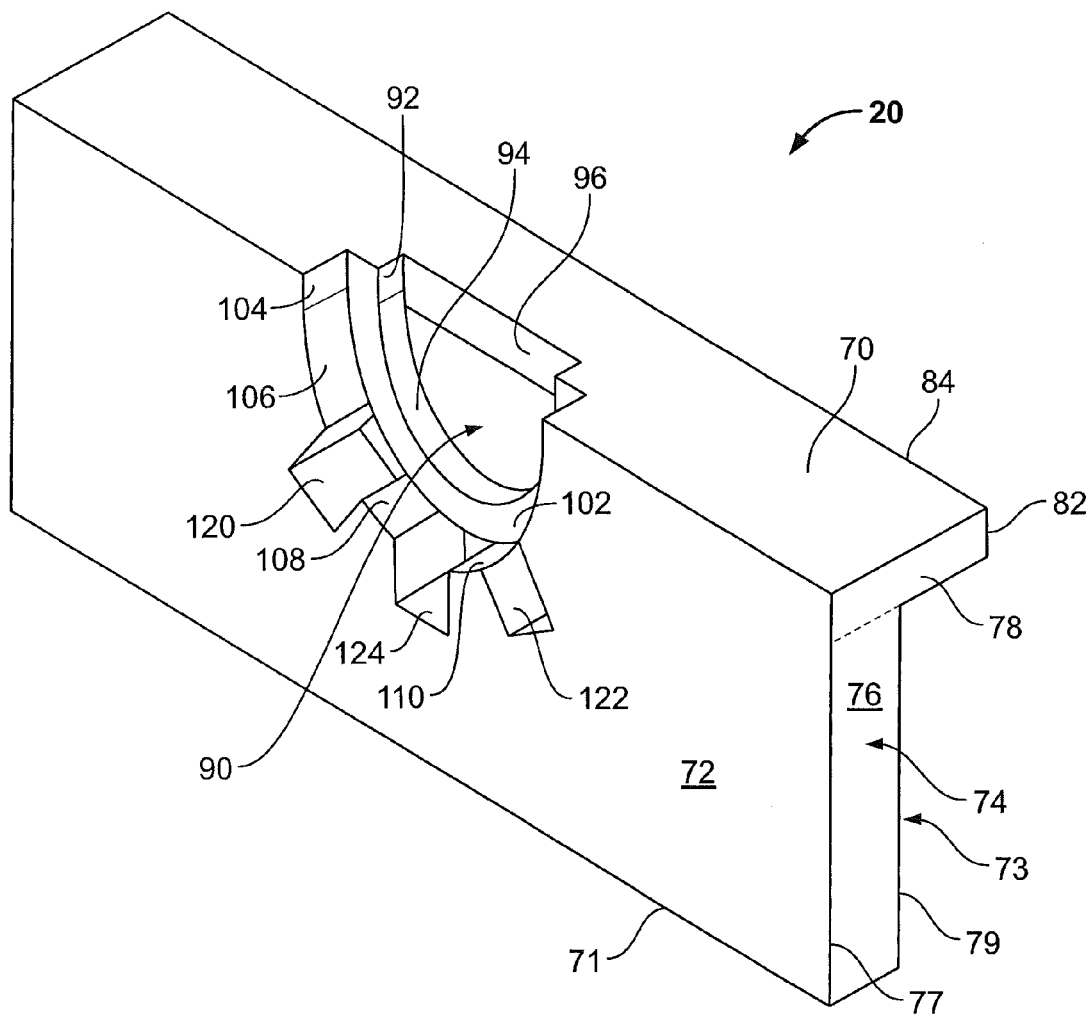
FIG. 7A is a perspective view of a detection member of the apparatus of FIG. 1.
Figure 7B:
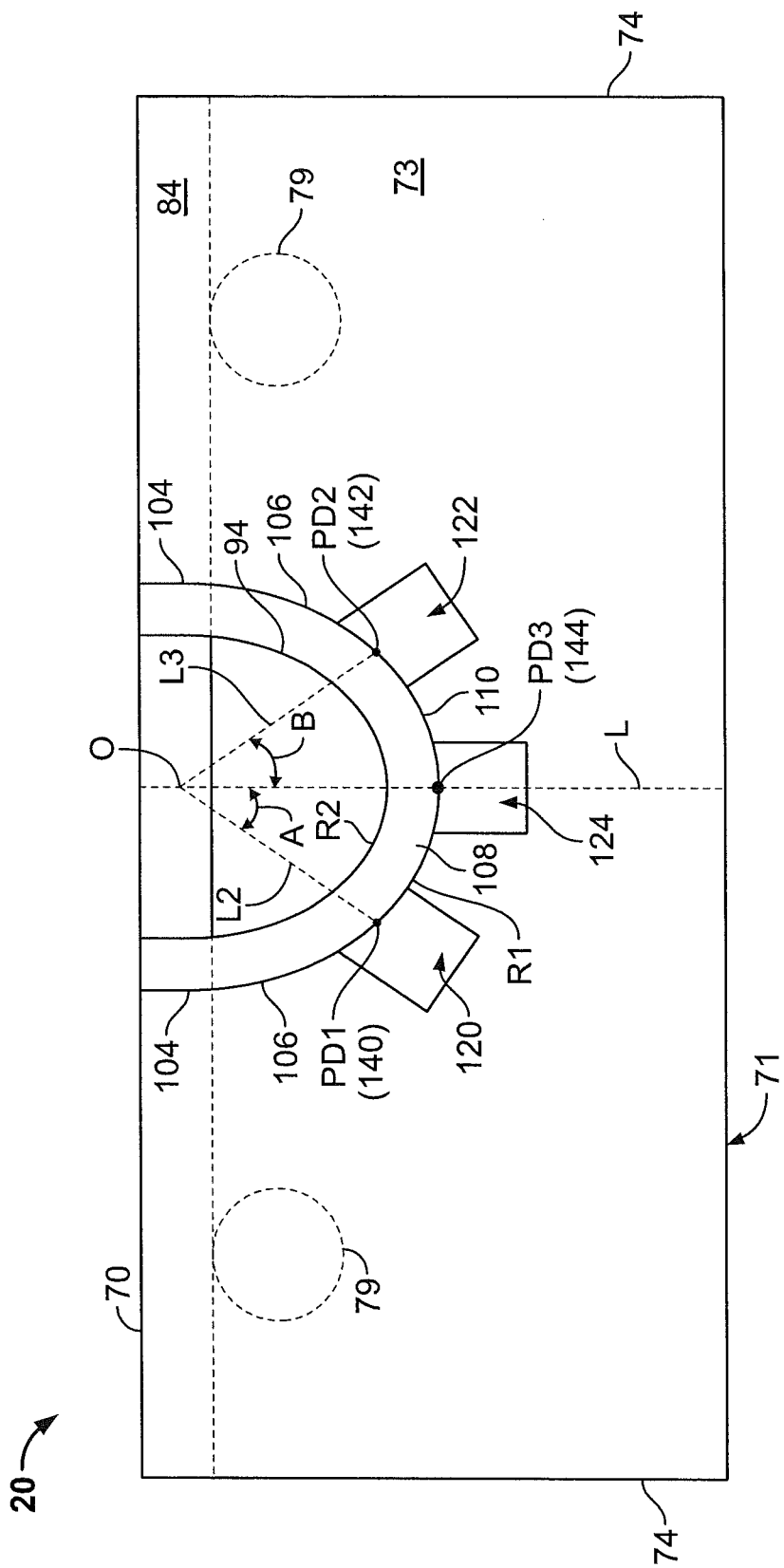
FIG. 7B is a front view of the detection member of FIG. 7A.

The detection member 20 may be formed from the same or similar materials as the bending member 18. Referring to FIGS. 7A-7B, the detection member may include a front surface 70, an inner surface 72 and an outer surface 73. The surfaces 71 and 73 desirably extend in planes perpendicular to the plane in which the surface 70 extends, and extend from opposing side surfaces 74. The opposing surfaces 74 desirably extend in planes parallel to each other and perpendicular to the planes in which the surfaces 70, 72 and 73 extend. The detection member 20 also includes a lower surface 71 which extends in a plane parallel to the plane in which the front surface 70 extends. The side surfaces 74 include a first surface portion 76 extending from an edge 77, from which the surface 72 extends, to an edge 79 from which the surface 73 extends, and a second surface portion 78 extending from the edge 77 to an opposing edge 82 spaced from the edge 79. The edges 77 and 79 desirably are parallel to each other, and the edges 77 and 82 desirably are parallel to each other. A bottom surface 84, which opposes and extends in a plane parallel to the plane in which the surface 72 extends and perpendicular to the plane in which the surfaces 78 and 70 extend, extends from the opposing edges 82 and from near the front surface 70. Referring to FIG. 2, the outer surface 73 may include threaded apertures 79 for receiving screws that may attach the detection member 20 to a circuit board 240 of the assembly 22.

Figure 8A:
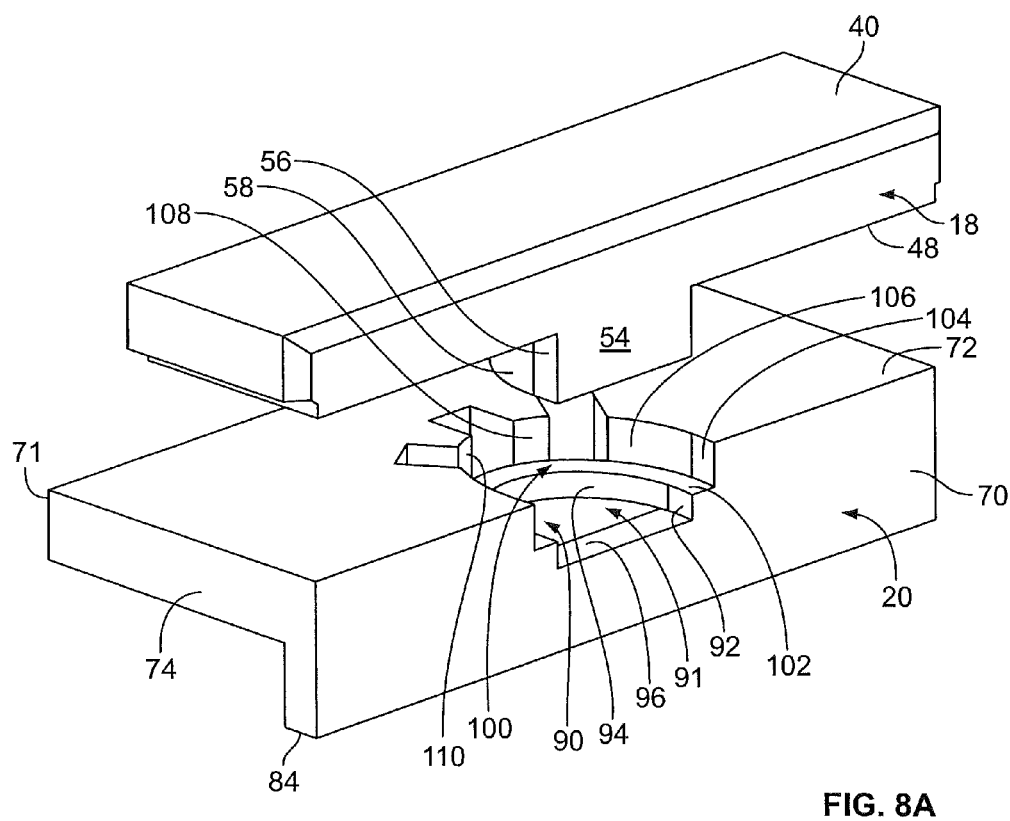
FIG. 8A is a perspective view of the bending member arranged aligned with and spaced from the detection member of the apparatus of FIG. 1.
Figure 8B:
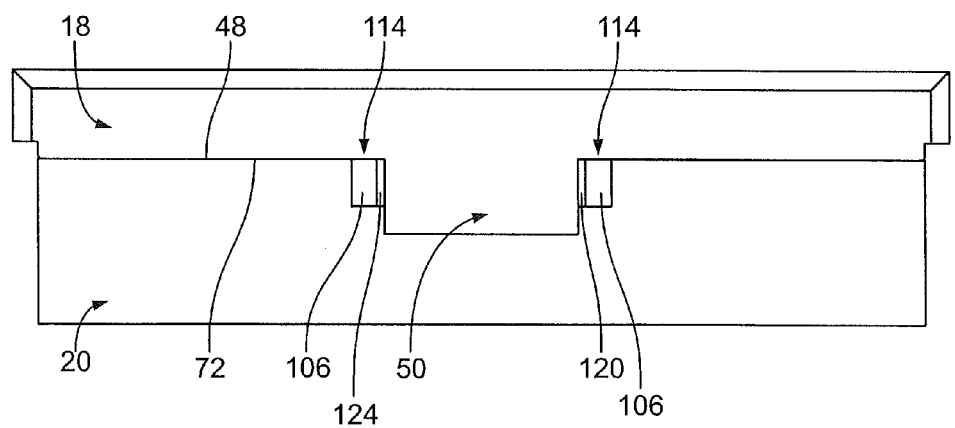
FIG. 8B is a top view of the bending member and the detection member of the apparatus of FIG. 1 arranged in an operational state.

Further referring to FIG. 8A, an optical fiber receiving and enclosure region 90 is defined between the opposing side surfaces 74 of the detection member 20. The region 90 includes a first region 91 defined by opposing parallel side surfaces 92 which extend in planes parallel to the planes in which the surfaces 74 extend, an arcuate surface 94 extending from the opposing surfaces 92 toward the surface 71 and an inner surface 96 extending from the opposing surfaces 92 and in a plane parallel to the plane in which the surface 84 extends. The surfaces 92, 94, 96 desirably are configured such that the region 91 has substantially the same size and shape as the bending unit 50 defined by the surfaces 52, 54, 56 and 58, thereby providing that the bending unit 50 may substantially occupy the first region 91, as shown in FIG. 8B.

In addition, the region 90 includes a second region 100 immediately adjacent to the region 91. The second region 100 is defined by an arcuate inner surface 102 extending from the front surface 70 toward the surface 71 and desirably extending in a plane parallel to the surface 96; opposing, parallel side surfaces 104 extending from the surface 70; and opposing first arcuate surfaces 106 extending respectively from the opposing side surfaces 104 toward the surface 71. In addition, the second region 100 is defined by a second arcuate surface 108 and a third arcuate surface 110. The surfaces 108 and 110 are spaced from each other and the surfaces 106.

Referring to FIG. 7B, the surfaces 108 and 110 desirably extend along an arc having a radius of curvature R1 with respect to a point of origin O. The radius of curvature R1 is greater than a radius of curvature R2 along which the arcuate surface 94 extends. Further referring to FIGS. 8A and 8B, the radii of curvature R1 and R2 provide that, when the apparatus 10 is in the assembled state with a portion of the bending unit 50 received in and occupying substantially all of the first region 91 and with the portion of the surface 48 of the bending member 18 that opposes the surface 72 of the detection member 20 contacting the surface 72, an arcuate groove or channel 114 is defined between the surfaces 104 and the opposing surfaces 56, between the surfaces 106, 108, 110 and the opposing surface 58, and between the surface 102 and the portion of the surface 48 opposing the surface 102. The arcuate channel 114 desirably is of sufficient cross-sectional dimension to contain an optical fiber therein with a minimum of unoccupied space in the channel 114, when the bending member 18 and the detection member 20 are arranged such that the assembled apparatus 10 is in an operational state, as shown in FIG. 8B.

Referring to FIGS. 7A, 7B and 8A, apertures 120 and 122 in the detection member 20 may be defined between the arcuate surface 108 and the adjacent arcurate surface 106, and the arcuate surface 110 and the adjacent arcuate surface 106, respectively. In addition, an aperture 124 may be defined in the detection member 20 between the arcuate surfaces 108 and 110. The apertures 120, 122, 124 extend from the radius of curvature R1 generally toward the surface 71.

Referring to FIG. 7B, the apparatus 10 may be adapted such that an angle A is defined between a line L, which extends perpendicular to the surface 70 and through the origin O, and a line L2, which extends through a point PD1 lying on R1 and positioned at the aperture 120, such as about midway between adjacent ends of the surfaces 106 and 108. In addition, an angle B is defined between the line L and a line L3, which extends through a point PD2 lying on R1 and positioned at the aperture 122, such as about midway between adjacent ends of the surfaces 106 and 110. In addition, the line L extends through a point PD3 lying on R1 and positioned at the aperture 124, such as about midway between adjacent ends of the surfaces 108 and 110.

Figure 10:
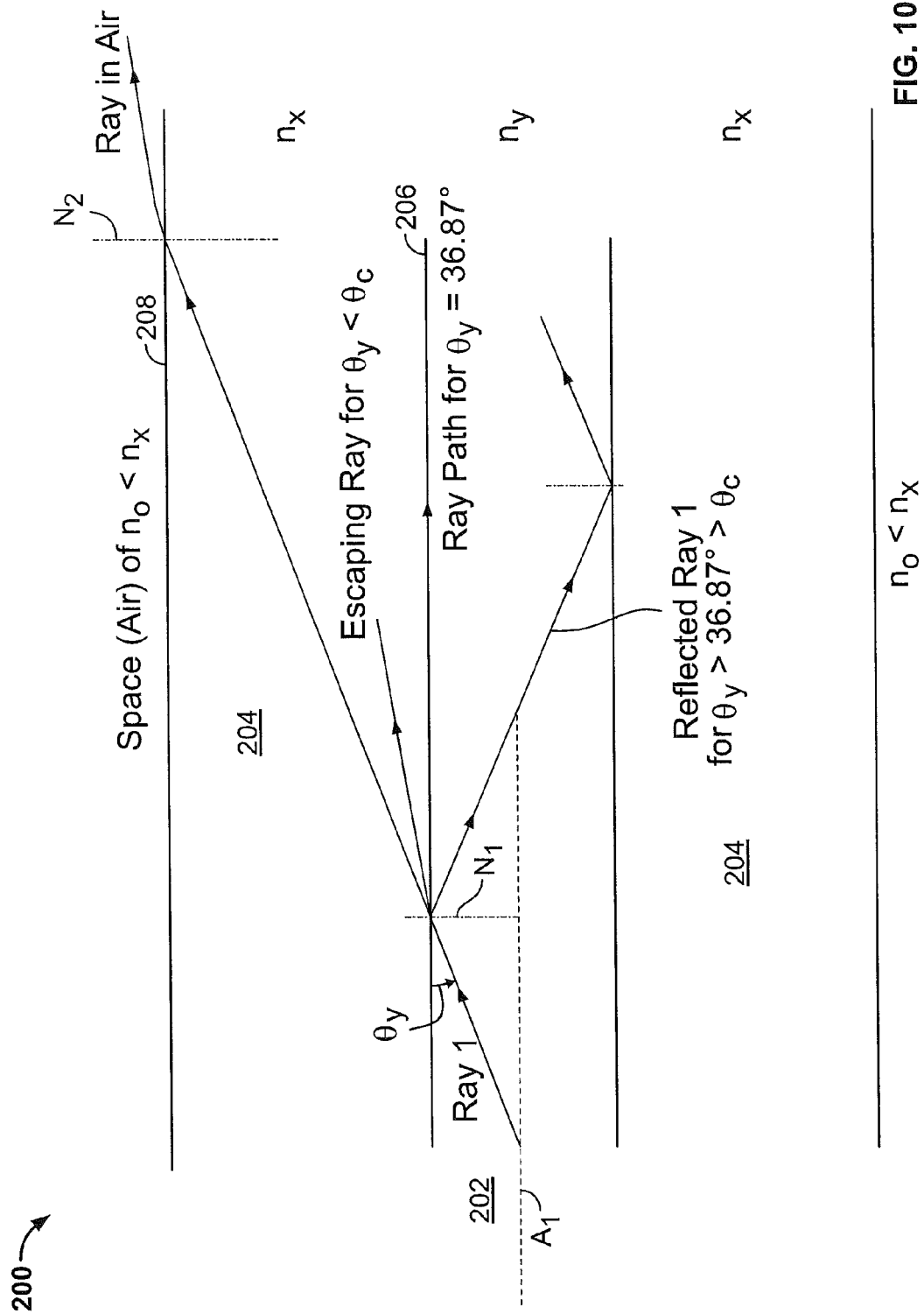
FIG. 10 illustrates propagation of optical rays in an exemplary optical fiber.

Referring to FIGS. 2, 7B and 10, the assembly 22 may be attached to the base member 12 with attachment means, such as screws 45, and the detection member 20 may be attached to the board 240 by screws (not shown) extending through apertures in the board 240 and into the apertures 79. The assembly 22 includes photodiodes 140, 142, 144 that detect optical energy and generate an electrical current representative of the amount of optical energy detected. The assembly 22 is adapted such that the photodiodes 140, 142, 144, which may be attached to the board 240, are arranged respectively at the points PD1, PD2, PD3 of the apertures 120, 122, 124, when the apparatus 10 is in the assembled state.

In accordance with aspects of the invention, the apparatus 10 may have a radius of curvature R1 and the photodiodes 140, 142 144 may be positioned respectively at the points PD1, PD2 and PD3 to provide that, when the assembled apparatus 10 is in the operational state with a portion of an optical fiber extending in a bent configuration through the channel 114 and an optical signal being conveyed through the fiber, light rays of the optical signal may be caused to escape the outer cladding of the bent portion of the optical fiber. Further, the photodiodes may be arranged substantially tangent to an outer jacket of the bent portion of the optical fiber to detect the escaping light rays, while optical energy other than that of the escaping light rays, such as light rays from external to the apparatus, is substantially prevented from being detected at the photodiodes.

To highlight the advantages of the invention, the construction and optical signal conveying characteristics of a typical optical fiber are described with reference to FIG. 10, which illustrates a cross-section of the exemplary optical fiber 200. Referring to FIG. 10, the optical fiber 200 may have an optically transparent core 202 with a refractive index $n_x$, an optically transparent cladding 204 with a refractive index $n_y$, and an outer surface 208, and a boundary 206 between the core 202 and the cladding 204. According to the law of refraction, for the optical fiber 200 $n_x \cos \theta_x = n_y \cos \theta_y$, where $\theta_y$ is the angle measured from the boundary 206 to a ray of light propagating in the core 202 and intersecting the boundary 206 and $\theta_x$ is the angle measured from the boundary 206 to a ray of light propagating in the cladding 204 from the boundary 206. A central longitudinal axis A1 of the core 202 is perpendicular to a line N1, which is normal to the boundary 206 and extends through the point on the boundary 206 at which a ray of light propagating in the core 202 (ray 1) at the angle $\theta_y$ intersects. In the typical optical fiber, $n_x/n_y=0.8$, i.e., $n_y>n_x$, such that an optical ray propagating in the core cannot escape from the core into the cladding so long as the ray propagates at less than a maximum angle $\theta_y$, where the maximum angle $\theta_y$ may be computed as follows:

$$\cos \theta_x = n_y/n_x \cos \theta_y = 1.25 \cos \theta_y$$

$$\lim \cos \theta_x = 1 \text{ at } \theta = 0°, \text{ so}$$

$$1.25 \cos \Delta y = 1, (\cos \theta_y = 0.8 = n_x/n_y) \text{ and}$$

$$\cos \theta_y^{-1} = \theta_y = \cos^{-1}(0.8) = 36.87°.$$

The maximum angle $\theta_y$ of 36.87° is usually called the critical angle of reflection $\theta_c$, where $$\theta_c = \cos^{-1} \theta_y \text{ and}$$

$$\theta_c = \cos^{-1}(n_x/n_y).$$

Therefore for $\theta_y < 36.87°$, $\cos(<36.87) + n_y/n_x > 1$, refraction is not possible and reflection occurs. In other words, the limit of the refraction law occurs at 36.87°. Thus for the optical fiber 200 where $n_x/n_y=0.8$, (i) when $\theta_y=36.87°$, the ray enters the cladding from the core and propagates substantially parallel to the boundary; (ii) when $\theta_y>36.87°$, the ray enters the cladding from the core and propagates radially outwardly, away from the boundary; and (iii) when $\theta_y<36.87°$ the refraction law shows that only reflection occurs. The ray of light propagating through the cladding may escape the cladding, where the medium at the outer surface of the cladding, such as the outer jacket of the optical fiber, has a refractive index $n_o$ that is less than $n_x$. The ray escaping the cladding is refracted away from a line N2, which is normal to the outer surface 208 of the cladding and extends from a point on the outer surface 208 of the cladding that the ray propagating through the cladding intersects.

Figure 11:
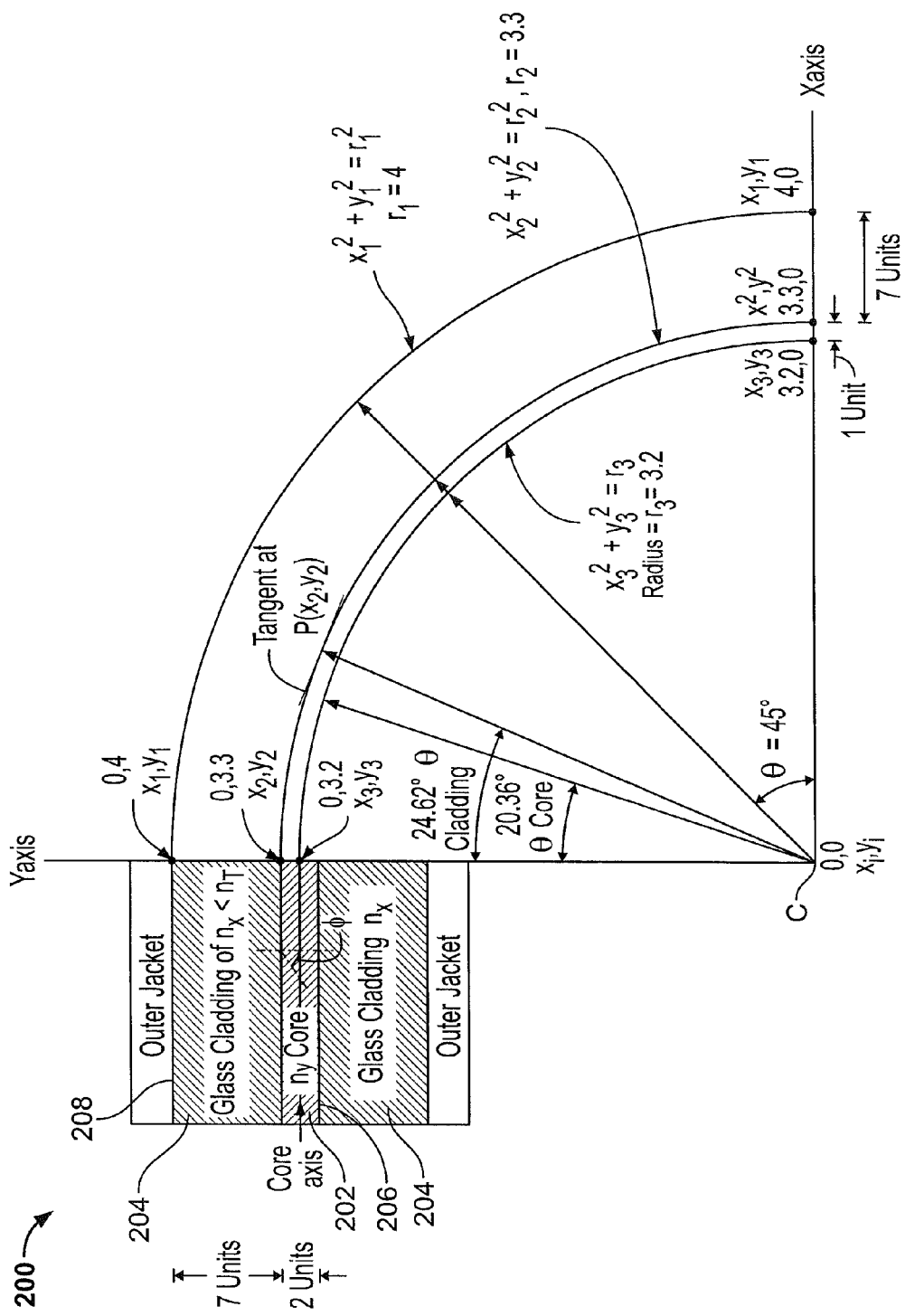
FIG. 11 illustrates an exemplary optical fiber in a bent configuration.

FIG. 11 shows the optical fiber 200 in a bent configuration and illustrated in relation to measurement units of an x-y coordinate grid. Referring to FIG. 11, the core 202 of the fiber may have a radial thickness of 1 unit and the cladding 204 may have a radial thickness of 7 units. Tan θ is equal to the slope of a radial line $r_i$ from an origin C to $P_i$ where $P_i$ is a point (x,y) and θ is the angle of the radius line $r_i$ with respect to the x-axis or y-axis. In addition, referring to FIG. 11, the slope of tangent to a circle=−x/y, the slope of a radial line to a tangent point=y/x, and the slope of a radial line=y/x. Thus, $x^2+y^2=r^2$ has a slope equal to y/x. For the curved or bent portion of the fiber 200, the boundary 208 has a radius of curvature, $R_1$, equal to 4 and at θ=45° the bent core and the two bent cladding sections have a slope=1. In addition, at $P(x_2,y_2)$ on the boundary 206 of the core, $\tan^{-1}(x_2/y_2)=\tan^{-1}(1.37477/3.0)=24.62°$, and the slope of the tangent (i.e., tan 24.62°=0.45826) to the curved boundary 206 is −x/y=−0.45826. In addition, the slope of a line normal to the point $P(x_2,y_2)=1/0.45826=2.18217$. Further, at $P(x_3,y_3)$, which is on the central axis of the core, $\tan^{-1}(x_3/y_3)=\tan^{-1}(1.11355/3.0)=20.36°$, and the slope of the tangent (i.e., tan 20.36°=0.3719) to the curved axis of the core is −x/y=−0.3719. In addition, the slope of a line normal to the point $P(x_3,y_3)=1/0.3719=2.694$.

Referring to the above relationships and FIG. 11, the angles θ with respect to the y axis become smaller as the radius of curvature of the optical fiber decreases. Φ, which is the angle of the ray of light propagating from the core to the cladding, therefore, needs to exceed $θ_c$ ($θ_c=\sin^{-1}(n_x/n_y)$); otherwise the ray not reflected is refracted and escapes the cladding into the jacket and then into air for typical plastic jackets of optical fibers. If the radius of curvature of the fiber is large enough so that a difference between θ at the core and θ at the cladding causes Φ not to exceed $θ_c$, then some rays escape in the bent portion of the optical fiber away from the 45 degree bend.

The apparatus 10 may be adapted to bend a portion of an optical fiber within the apparatus 10, in accordance with aspects of the invention, to cause $θ_c$ to change, so as to allow rays in the core to escape through the outer cladding and be detected externally by the photodiodes in the apparatus 10. In addition, some deformation of the fiber may cause rays to escape. In some embodiments, referring to FIG. 7A, the photodiodes 140, 142 and 144 may be arranged on the radius of curvature R1 of the groove 114, where the angles A and B are between about 22.5 and 37.5 degrees, and desirably about 34 degrees, such that photodiodes 140 and 142 are spaced between about 45 and 75 degrees from each other on the radius of curvature R1, to provide that the photodiodes 140, 142 and 144 may detect light caused to escape from the bent portion of the optical fiber extending along the groove 114. Furthermore, as discussed above, referring to FIGS. 1-2, 8A and 8B, when the assembled apparatus 10 is in the operational state, the bending unit 50 of the bending member 18 substantially occupies the region 91 and the surfaces 48 and 72 are substantially flush against each other to define the channel 114, such that the foams of the bending member and detection member and the configuration of the channel 114 substantially avoid, and preferably completely prevent, light from external to the apparatus 10 to impinge upon the photodiodes 140, 142, 144.

Figure 12:
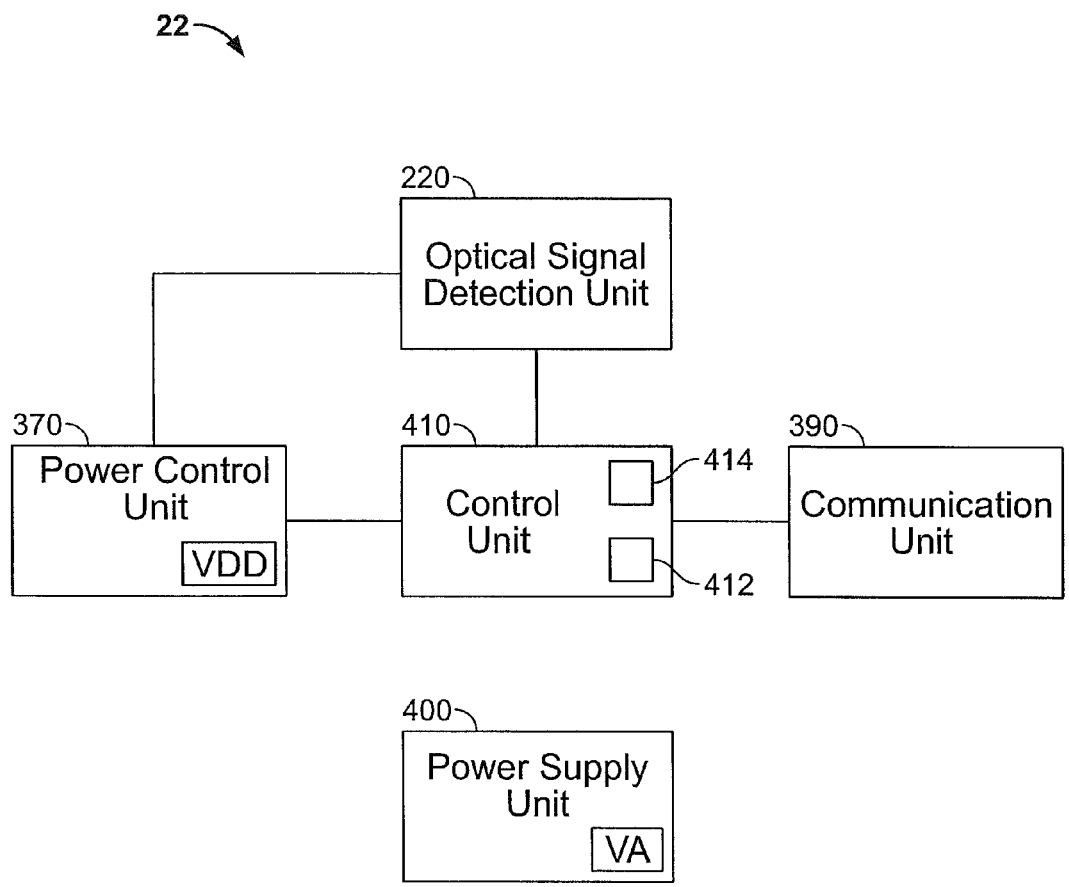
FIG. 12 is an exemplary block diagram of an electro-optical assembly, in accordance with an aspect of the invention.

Referring to the FIG. 12, in one embodiment, the assembly 22 may include an optical energy detection unit 220, a power control unit 370, a communication unit 390, a power supply unit 400 and a control unit 410. Referring to FIG. 2, in one embodiment, the photodiodes 140, 142 and 144 desirably are included in the detection unit 220 and mounted on the printed circuit board 240 of the assembly 22. The assembly 22 may desirably operate to avoid an incorrect determination of whether an optical signal is being conveyed in an optical fiber installed in the apparatus 10. The incorrect determination may include an incorrect indication that an optical signal is being conveyed in the optical fiber ("false positive"), which may be caused by DC offset drift of operational amplifiers typically included in optical signal detection circuitry and to which the photodiodes supply an electric current representative of optical radiation detected at the photodiodes. Also, the incorrect determination may include an indication that an optical signal is not being conveyed ("false negative"), which may occur when a modulated optical signal is transmitted in the optical fiber. In addition, the assembly 22 may desirably provide that different optical energy levels be set as a threshold detection level at which a determination is made by the assembly 22 that an optical signal is being conveyed through a fiber.

The power supply unit 400 may receive an AC or DC voltage, and include circuitry to provide a desired DC supply voltage VA, such as 5 V, to power electrical components of the assembly 22. In addition, the power supply unit 400 may supply a power supply signal or data to the control unit 410 to indicate whether the voltage VA is being supplied to the components of the assembly 22.

The power control unit 370 may include circuitry adapted to provide an output power VDD having a predetermined frequency and duty cycle. For example, the power control unit 370 may contain a clocked 1-shot, such as a dual retriggerable monostable multivibrator, that may operate to control the frequency and duty cycle of the output power VDD. The output power VDD may be the electrical power that energizes operational amplifiers of the detection unit 220, as described in below.

The communication unit 390 may include components that can provide for wired or wireless communication of data.

The optical energy detection unit 220 may include optical components for detecting optical energy, electronic components for supplying an electrical signal representative of the detected optical energy and components for indicating whether an optical signal in the optical fiber installed within the apparatus is detected.

Figure 13:
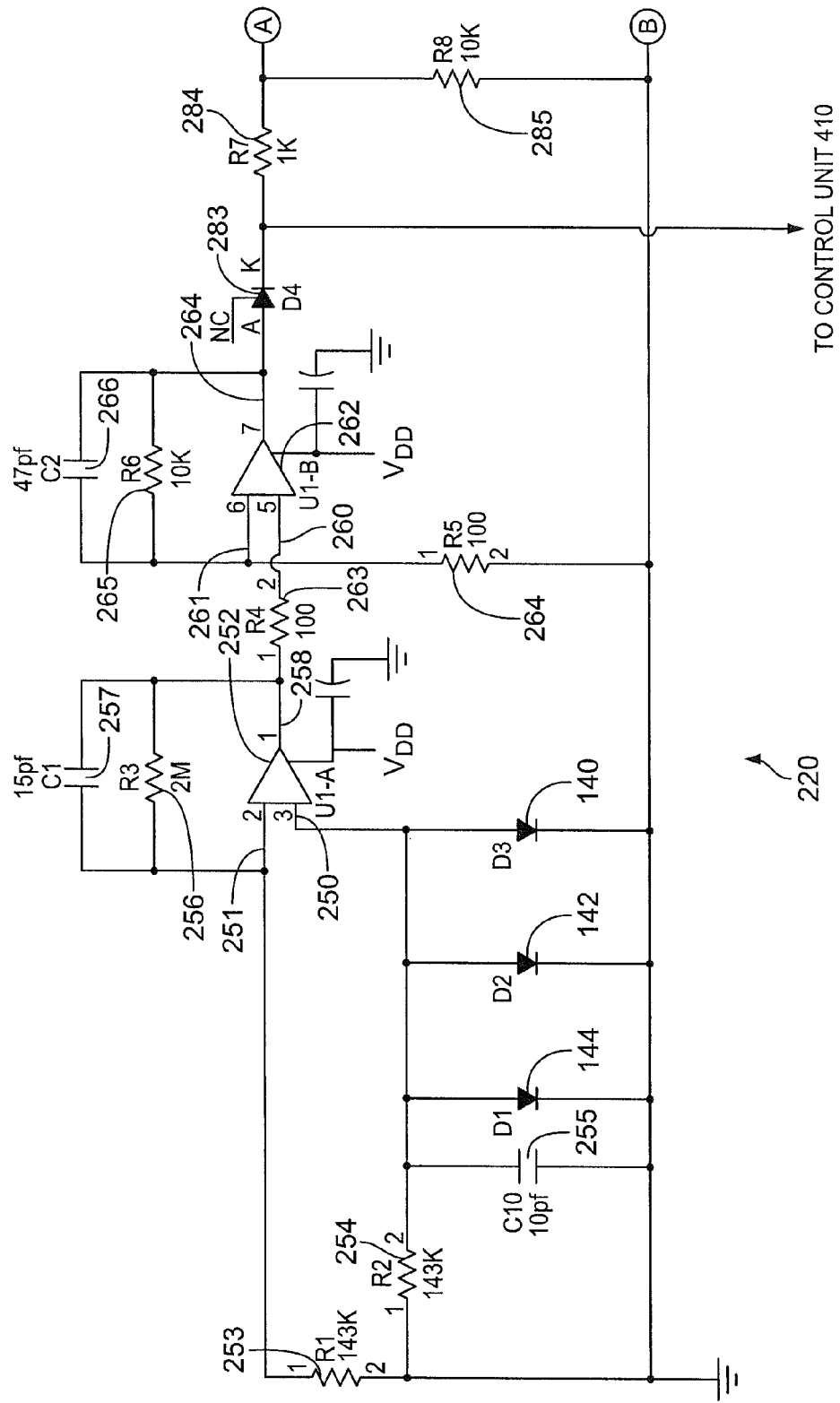
FIG. 13 is an exemplary optical energy detection unit, in accordance with an aspect of the invention.
Figure 13:
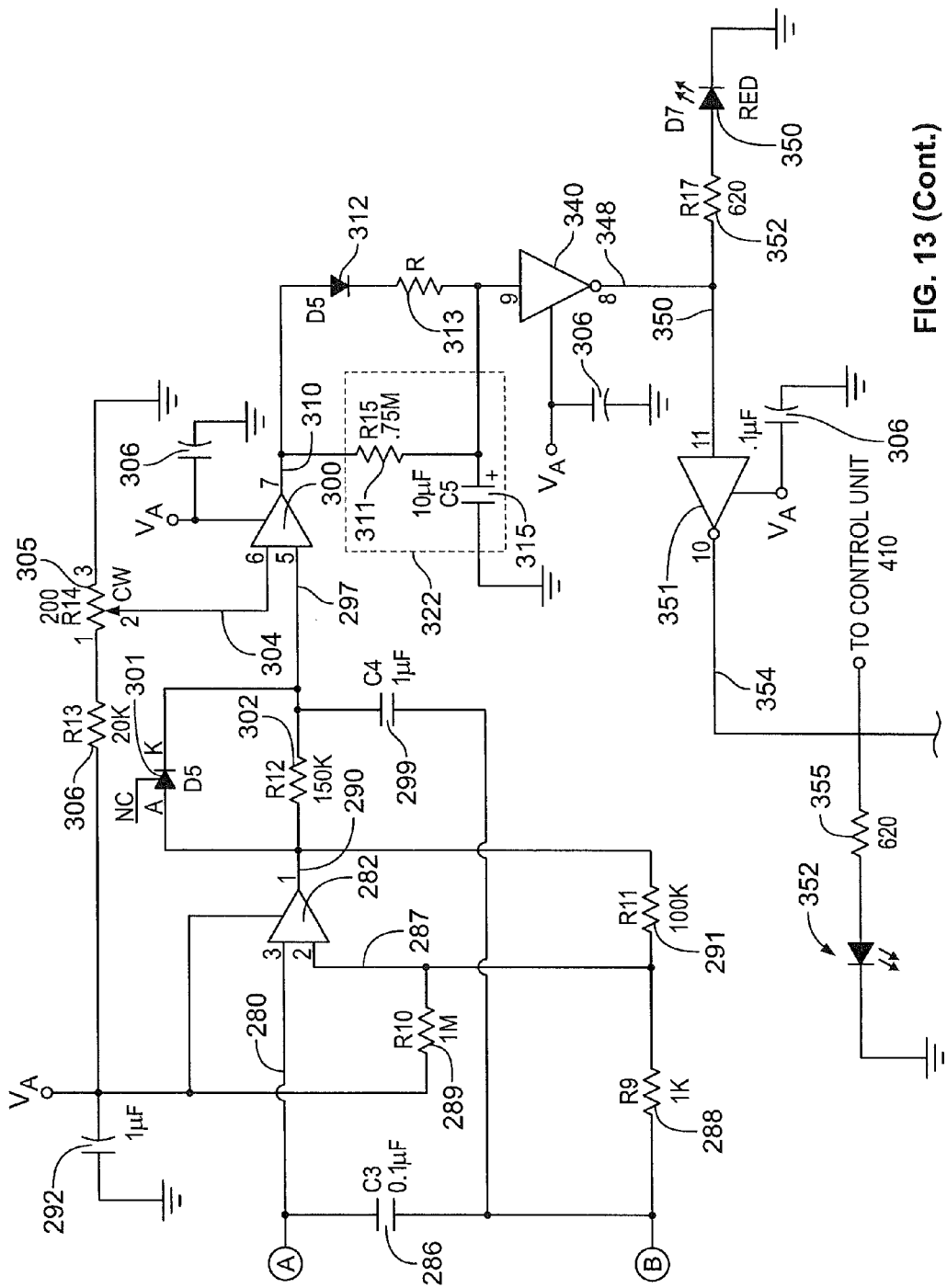

In one embodiment, referring to FIG. 13, the unit 220 may include the photodiodes 140, 142, 144 each of which is connected to an inverting input 250 of an operational amplifier 252. A positive input 251 of the amplifier 252 is connected to ground through a resistor 253 of 14.3 kOhms. In addition, the input 250 is connected to ground through a parallel circuit of a resistor of 14.3 kOhms and a capacitor 255 of 10 pF. A parallel circuit of a resistor 256 of 2 MOhms and a capacitor 257 of 15 pF connects the input 251 to output 258 of the amplifier 252, such that the amplifier 252 may provide 23 db of amplification. The output 258 is connected to negative input 260 of an operational amplifier 262 through a resistor 264 of 100 ohms. A positive input 261 of the amplifier 262 is connected to ground through a resistor 264 of 100 ohms, and to an output 264 of the amplifier 262 through a parallel circuit of a resistor 265 of 10 kOhms and a capacitor of 47 pF, such that the amplifier 262 has a gain of 40 db.

The output 264 of the amplifier 262 is connected to a positive input 280 of an operational amplifier 282 through a small signal gain diode 283 and a resistor 284 of 1000 ohms. The input 280 is connected to ground through a parallel circuit of a resistor 285 of 10 kOhms and a capacitor of 0.1 μF. A negative input 287 of the amplifier 282 is connected to ground through a resistor 288 of 1000 ohms, to the output power VA provided by the power supply unit 400 through a resistor 289 of 1 MOhm, and to an output 290 of the amplifier 282 through a resistor 291 of 100 kOhms. Further, the resistor 289 is connected to ground through a capacitor 292 of 1 μF. The output 290 is connected to a positive input 297 of an operational amplifier 300 through a parallel circuit of a small signal gain diode 301 and resistor 302 of 150 kOhms. The input 297 is connected to ground through a capacitor 299 of 1 μF. A negative input 304 of the amplifier 300 is connected to the output power VA through a variable resistor 305 of 200 ohms connected in series to a resistor 306 of 20 kOhms. The amplifier 300 is supplied the output power VA at a terminal (not shown) connected to ground through a capacitor 306 of 1 μF.

An output 310 of the amplifier 300 is connected to an input 339 of an inverter 340 through a circuit element of a resistor 311 of 0.75 MOhms in parallel with a series connection of a small signal gain diode 311 and a resistor 313 of 1.5 MOhms. In addition, the input 339 is connected to ground through a capacitor 315 of 10 μF. The capacitor 315 and the resistor 311, in combination, operate as an RC filter of the input 339 to the inverter 340.

An output 348 of the inverter 340 is connected to an input 350 of an inverter 351. The input 350 is connected to ground through a resistor 352 of 520 Ohms and a LED 350 that emits red light. The inverters 340 and 351 are each supplied power from the power supply VA at supply ports (not shown) connected to ground through a capacitor 306 of 1 μF. An output 354 of the inverter 351 is connected, through a resistor 355 of 620 Ohms, to a LED 360 that emits green light.

The control unit 410 may include a processor and a memory (not shown) including instructions executable by the processor to perform functions of the invention, as described herein. In one embodiment, the control unit 410 may cause an indicator, such as a speaker or a light indicator 412, to indicate whether the components of the assembly 22 are energized by power from the power supply unit 400. In another embodiment, the control unit 410 may control the communication unit 390 to transmit information indicating a result of a determination whether an optical signal is being conveyed in an optical fiber, and whether the components of the apparatus 10 are in an energized state based on supply of power from the power supply unit 400.

In an exemplary operation of the apparatus 10, referring to FIGS. 7B and 12 and 13, an optical signal, such as at a wavelength of 850 nm, being conveyed in a bent portion of an optical fiber installed in the assembled apparatus 10 which is in the operational state, may be detected at the photodiodes 140, 142, 144. The photodiodes, in turn, create a current that flows through the amplifier 252 at which the current is amplified 23 db. The output of the amplifier 252 drives the amplifier 254, which amplifies the output of the amplifier 252 with a gain of 40 db. In one embodiment, the DC offset of the amplifier 252 desirably is 125 mV with 5 mV noise when optical radiation is not impinging upon the photodiodes.

In one embodiment, the power control unit 370 may supply the output power VDD used to power the amplifiers 252 and 262, and control VDD, such that the amplifiers 252 and 262 are turned off at a predetermined frequency, for example, every 6 seconds, for a predetermined time interval, for example, 350 ms. The amplifiers 252 and 262 may have internal circuitry that disconnects their inputs and outputs from external circuits, recalibrates DC offset errors to within the amplifier specifications, for example, 40 μV, within about 315 ms following a time instant at which the amplifiers are repowered, and then returns the amplifiers to a normal amplifier mode. Thus, the DC offsets of the amplifiers 252 and 262 may be maintained within their specifications, based on the controlled supply of the output power VDD by the power control unit 370, thereby advantageously avoiding drift of the DC offset of the amplifiers, which may cause false positive indications.

The current output from the amplifier 262 is supplied, through the small signal gain diode 283, to the amplifier 282, where the current is amplified by 40 db. The diode 283 operates to effectively reduce the DC offset error of the amplifiers 252 and 262 when the optical radiation detected at the photodiodes is below −30 dbm. The amplifier 300, which receives the output of the amplifier 282, operates as a comparator 320 having a 5 mV bias at its negative input 304. This biasing may compensate for the DC offset level of the amplifiers 252 and 262, and provide that, despite the DC offset of the 252 and 262, the assembly 22 indicates that "no" optical signal is detected, when the photodiodes do not detect any optical energy.

In addition, the output of the comparator 320 may be delayed by, for example, 7.5 seconds, which is a function of the RC time constant of the RC filter 322. Hence, an indication that an optical signal is being conveyed in the optical fiber 200 is provided only after a predetermined time, i.e., the RC time constant, elapses since the start of detection at the photodiodes of optical energy escaping from the optical fiber.

The delayed output then drives the inverters 340 and 351, which cause the red LED 350 to illuminate, indicating a determination by the unit 220 that an optical signal is not being conveyed in the optical fiber, and the green LED 360 to illuminate, indicating a determination by the unit 220 that an optical signal is being conveyed in the optical fiber.

In one embodiment, the output of the inverter 351, and the output of the amplifier 262, may be provided to the control unit 410. The control unit 410 may determine, based on the voltage level output from the inverter 351 or the voltage level output from the amplifier 262, whether an optical signal is being conveyed in the optical fiber and provide a corresponding indication based on the determination.

In one embodiment, after a delay of 7.5 seconds, the red LED may illuminate to indicate, and the control unit may based on the output of the inverter 351 or the amplifier 262 provide an indication of, an absence of an optical signal when an optical power level of an optical signal, such as having a frequency of 850 nm, being conveyed in an optical fiber is detected by the assembly 22 as being less than a predetermined level, such as −33 dbm.

In another embodiment, the green LED may illuminate, and the control unit may determine that the output of the inverter 351 indicates presence of an optical energy signal, within about 5 seconds after an optical signal having a predetermined optical power level begins to be continuously conveyed in an optical fiber.

In a further embodiment, the control unit 410 may, when determinations are made that an optical signal is being conveyed in an optical fiber, for example, continuously for a period of 10 seconds, and then determinations are made, such as continuously for about 1 second, that an optical signal is not being conveyed and then begins to be conveyed continuously for a predetermined time, such as at least 2 seconds, provide an indication that an optical signal is being conveyed within a predetermined time interval, for example, about 3 seconds, after the end of the time interval during which an optical signal was not conveyed in the fiber. The predetermined time interval is less than the time delay, such as 7 seconds, before the assembly 22 begins to indicate that an optical signal is being conveyed from a time instant that an optical signal is detected as being conveyed in the fiber. For example, after an optical fiber is installed in the operational state in the assembled apparatus 10 and an optical signal is conveyed through the fiber, the assembly 22 does not provide an indication that an optical signal is being conveyed until after an initial delay of 7 seconds from a time instant at which the assembly 22 begins to detect that optical energy is escaping continuously from the fiber. In a further embodiment, if the conveyance of an optical signal in the optical fiber is temporarily interrupted, for example, for 3 seconds, and then the optical signal once again begins to be conveyed through the fiber, the assembly 22 may indicate that the optical signal is being conveyed in the optical fiber within a predetermined time, such as three seconds, following the interruption, which is less than the time delay.

In addition, the detection unit 220 may operate to accurately determine whether an optical signal is being conveyed, such as when an optical signal whose energy level is modulated is being conveyed through the fiber under test, thereby avoiding false negatives.

In a further embodiment, the control unit 410 may provide an indication at an alarm unit 412, such as at speakers or a light emitter, or cause the communication unit 390 to communicate alert data by wireless or wired communication, when an optical energy level of the detected optical signal decreases a predetermined amount or to below a predetermined level. For example, the control unit 410 may, based on the output of the amplifier 262, determine an optical energy level detected at the photodiodes. The control unit may cause an alarm to be provided when the detected optical energy level decreases from a first detected level, which is detected when an optical signal is conveyed through the fiber corresponding to expected operation of the fiber with an optical signal being conveyed therethrough, to an amount set at the control unit that is less than the first detected level. The set amount may be based on input by a user of the apparatus 10 provided at an input device 414, such as a keypad or the like, of the control unit 410.

In one embodiment, the power supply unit 400 may provide about 5 KV electrical isolation for a predetermined period, such as about 500 msec, and about 3 KV electrical isolation continuously.

Referring to FIGS. 9A-9G, an exemplary installation of the optical fiber 200 in the apparatus 10 to provide that a determination may be performed whether an optical signal is being conveyed in the optical fiber 200 is described. It is assumed that the apparatus 10 is initially in the assembled state, as shown in FIG. 9A. Referring to FIG. 9B, the screws 39 are loosened, if necessary, to permit the front cover 16 with the attached bending member 18 to be slid upwardly away from the end panel 23. Referring to FIG. 9C, the optical fiber 200 is then bent into a U-shape and inserted into the apparatus 10 at the base segment 31B. The U-shaped portion of the fiber is moved sufficiently toward the end panel 23 to extend slightly beyond the lowest point of the arcuate surface 58. Then, referring to FIG. 9D, the fiber 200 is moved into the respective legs 31A of the aperture 31, so that the U-shaped segment of the fiber 200 within the apparatus 10 lies flush against the surfaces 48, 56 and 58, as shown in FIG. 9E. The front cover 16 is then moved toward the base panel 23 and the screws 39 are tightened to fixedly secure the front cover 16 to the base member 12, as shown in FIG. 9F. The apparatus 10 with the fiber 200 therein is now in the operational state, with the fiber 200 received within the channel 114. As discussed above, based on the radius of curvature R1 that the portion of the fiber 200 within the apparatus 10 follows, when an optical signal is conveyed through the fiber 200, optical energy is caused to escape the fiber 200 at or near the photodiodes 140, 142, 144, which are positioned tangent to the fiber, thereby permitting accurate detection of whether an optical signal is being conveyed through the fiber.

In another embodiment, the apparatus may include any desired number of photodiodes arranged along the radius of curvature R1, and the fiber may be a single or multimode fiber.

In a further embodiment, the bending member and detection member may be formed from a foam material having a relatively smooth finish, and desirably having a closed cell foam construction, which provides that the surfaces of such members have a low coefficient of friction. Thus the respective members can easily slide in relation to each other, such as during installation and removal of an optical fiber from the apparatus. A low coefficient of friction avoids damage to an optical fiber during installation and removal from the apparatus, because typically an optical fiber is slid manually over the foam of the bending member during installation and removal from the apparatus.

In another embodiment, the front cover 16 may be attached with a hinge to the edge 24 of base panel 12, such that the front cover 16 may be rotated about the hinge and away from the detection member to provide that an optical fiber may be installed in or removed from the apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for optical signal detection:
   a housing including a first member and a second member, the first member being independent of the second member,
   wherein the first member has a first surface from which a bending unit projects, the bending unit having an arcuate surface,
   wherein the second member has a second surface and defines a cavity having a first cavity portion and a second cavity portion, the first cavity portion having a first arcuate surface and the second cavity portion having a second arcuate surface,
   wherein the first and second members are movable relative to each other to obtain an operational state of the apparatus in which the first and second surfaces face and contact each other, the bending unit occupies substantially all of the first cavity portion and a portion of the arcuate surface of the bending unit opposes the second arcuate surface to define a channel having a predetermined radius of curvature coextensive with the second arcuate surface; and
   at least one photodetector at the second arcuate surface such that, when the apparatus is in the operational state and an optical fiber is installed extending through the channel, the photodetector is tangent to an arcuately extending portion of the optical fiber within the channel, wherein the radius of curvature is adapted to cause optical energy to escape from a portion of the optical fiber installed in the channel adjacent to the photodetector and be detected at the photodetector when an optical signal is being conveyed in the optical fiber.

2. The apparatus of claim 1, wherein the bending unit and portions of the second member defining the channel include a resiliently deformable material that absorbs optical radiation.

3. The apparatus of claim 2, wherein, when the apparatus is in the operational state, substantially all optical energy from external the apparatus entering the channel is absorbed by at least one of the bending unit and the portions of the second member.

4. The apparatus of claim 1, wherein a plurality of photodetectors are arranged at the second arcuate surface spaced from each other and are tangent to the optical fiber when the optical fiber is installed in the channel and the apparatus is in the operational state.

5. The apparatus of claim 1, wherein, when the apparatus is in the operational state with the optical fiber is installed in the channel, the first and second members contact the optical fiber to hold the optical fiber substantially fixed in place within the channel.

6. The apparatus of claim 1, wherein the first member is coupled to and movable relative to the second member to obtain the operational state.

7. The apparatus of claim 1, wherein, when the apparatus is in the operational state, an interior portion of the channel at the portion of the second arcuate surface including the photodetector is optically isolated from optical energy external to the apparatus.

8. The apparatus of claim 1, wherein the bending unit has a thickness extending from the first surface exceeding a predetermined thickness.

9. The apparatus of claim 8, wherein the predetermined thickness is a diameter of an optical fiber.

10. An apparatus for optical signal detection comprising:
a housing having a first member and second member, the first member being independent of the second member, wherein the first and second members are movable relative to each other so as to contact each other to define a channel having a predetermined radius of curvature coextensive with an arcuate surface of the second member;
at least one photodetector at the arcuate surface such that, when the first and second members are moved to respective positions to define the channel and an optical fiber is installed extending through the channel, the photodetector is tangent to an arcuately extending portion of the optical fiber within the channel, wherein the radius of curvature causes optical energy to escape from a portion of the optical fiber installed in the channel adjacent to the photodetector and be detected at the photodetector when an optical signal is being conveyed in the optical fiber; and
an indicator to indicate detection of optical energy at the photodetector when the optical fiber is installed in the channel and an optical signal is being conveyed in the optical fiber.

11. The apparatus of claim 10 further comprising:
a control unit operable to control an indication that the photodetector detected optical energy when the optical fiber is installed in the channel.

12. The apparatus of claim 11, wherein the control unit is operable to indicate that an optical energy level detected at the photodetector is less than a predetermined level.

13. The apparatus of claim 12, wherein the predetermined level is set in relation to an expected optical energy level to be detected when an optical signal is conveyed in the optical fiber installed in the apparatus.

14. The apparatus of claim 13, wherein the predetermined level is based on input information.

15. The apparatus of claim 11, wherein the control unit is operable to delay an indication that an optical energy level is detected at the photodetector.

16. The apparatus of claim 10 further comprising:
a power control unit to control electrical power supplied to an amplifier to which an electrical output of the photodetector is supplied.

17. The apparatus of claim 16, wherein the power control unit controls duty cycle and frequency of the electrical power.

18. The apparatus of claim 16 further comprising the amplifier, the amplifier being operable to adjust a DC offset error in relation to a predetermined level a predetermined time after supply of electrical power to the amplifier following a time interval during which electrical power is not supplied to the amplifier.

19. The apparatus of claim 18, wherein the predetermined level is set in relation to an expected level of optical signal energy detected at the photodetector.

20. The apparatus of claim 10, wherein the indication that optical energy is detected at the photodetector is delayed until a predetermined time interval elapses since a time instant when the photodetector begins continuously detecting optical energy.

* * * * *